(12) United States Patent  (10) Patent No.: US 7,163,246 B2
Anzaldua  (45) Date of Patent: Jan. 16, 2007

(54) BRICK GRIPPING DEVICE

(76) Inventor: Joseph R Anzaldua, 3880 S. Big Springs, Grandville, MI (US) 49418

( * ) Notice: Subject to any disclaimer, the term of this patent is extended or adjusted under 35 U.S.C. 154(b) by 0 days.

(21) Appl. No.: 11/046,613

(22) Filed: Jan. 28, 2005

(65) Prior Publication Data

US 2005/0168000 A1   Aug. 4, 2005

Related U.S. Application Data

(60) Provisional application No. 60/540,376, filed on Jan. 30, 2004.

(51) Int. Cl.
*B65G 7/12* (2006.01)

(52) U.S. Cl. .......................... 294/62; 294/16

(58) Field of Classification Search ................. 294/15, 294/16, 103.1, 104, 62, 63.1, 164, 167, 168
See application file for complete search history.

(56) References Cited

U.S. PATENT DOCUMENTS

| | | | | |
|---|---|---|---|---|
| 657,294 | A | * | 9/1900 | Norcross ..................... 294/62 |
| 800,341 | A | * | 9/1905 | Tift .............................. 294/62 |
| 1,041,949 | A | * | 10/1912 | Bandemer ..................... 294/62 |
| 1,153,269 | A | * | 9/1915 | Sturm, Sr. ..................... 294/62 |
| 1,364,128 | A | * | 1/1921 | Messinger .................... 294/62 |
| 1,581,077 | A | * | 4/1926 | Mosier ......................... 294/62 |
| 1,586,475 | A | * | 5/1926 | Schondelmayer et al. .... 294/62 |
| 3,059,954 | A | * | 10/1962 | Matejicek .................... 294/16 |
| 5,039,150 | A | | 8/1991 | Jones et al. |
| 5,826,927 | A | | 10/1998 | Long |
| 6,481,769 | B1 | | 11/2002 | Harris et al. |

* cited by examiner

*Primary Examiner*—Dean J. Kramer
(74) *Attorney, Agent, or Firm*—Robert A. Brown

(57) ABSTRACT

A gripping device for handling heavy, dense articles made from organic materials formed into bricks, fired at high temperatures in kilns and for movement of the bricks from a storage area to a location for installation in a driveway, roadway, or the like to endure the wear and tear of pedestrian and vehicular traffic that moves thereover. The gripping device includes a base member, an associated telescopic member and a handle operable to clasp together a vertical row of stacked bricks into a secure assembly and thereafter maintain the assembly in a locked position as a worker carries the assembly from a storage area to a place of installation. The device includes a release mechanism operable to quickly disengage the stacked bricks at any desired location on a work site.

14 Claims, 2 Drawing Sheets

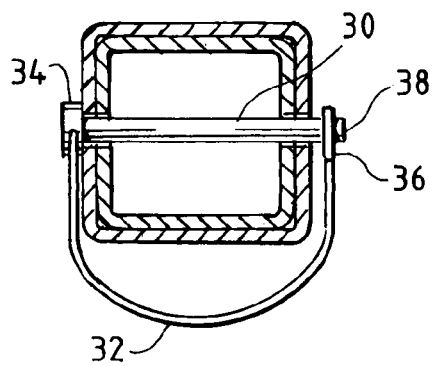
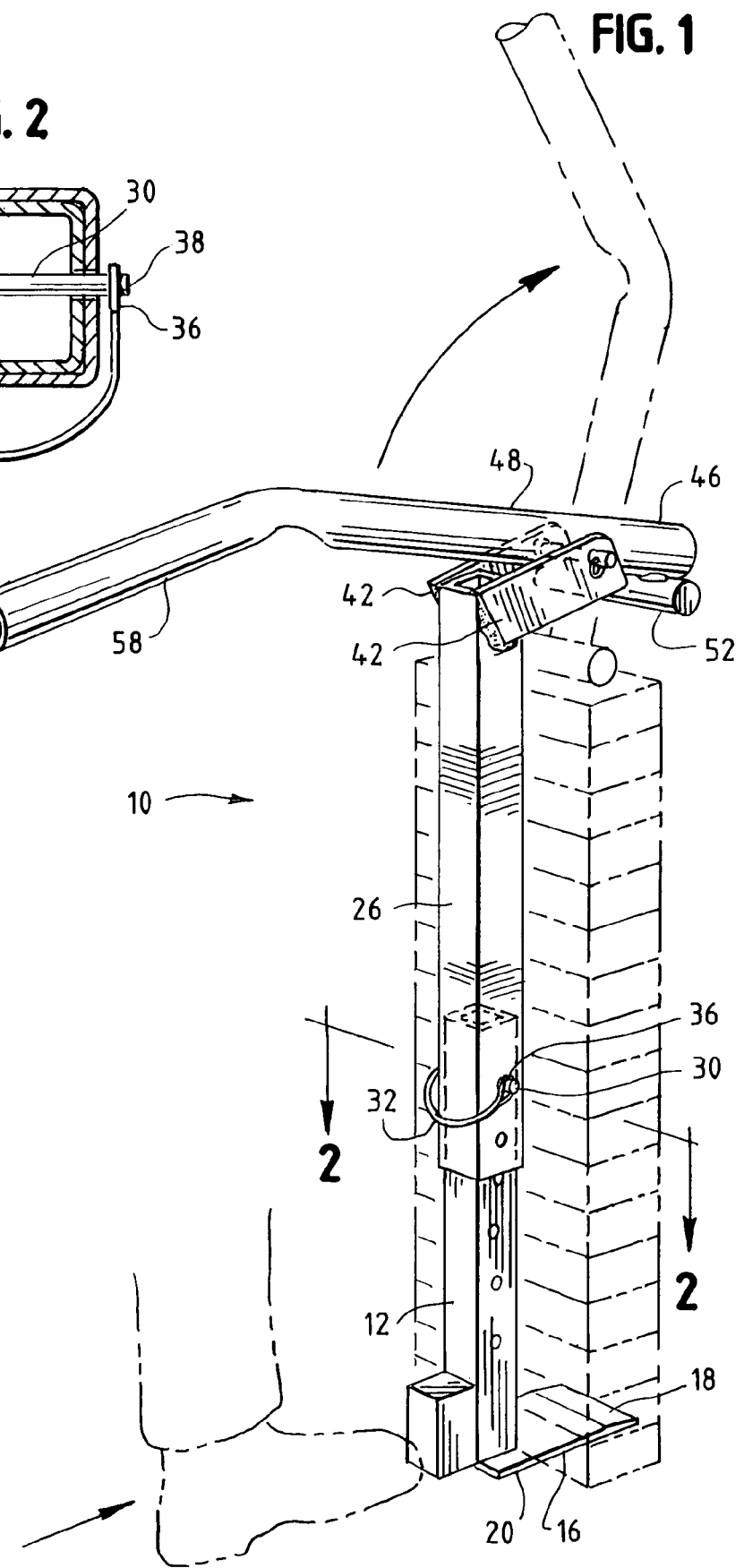

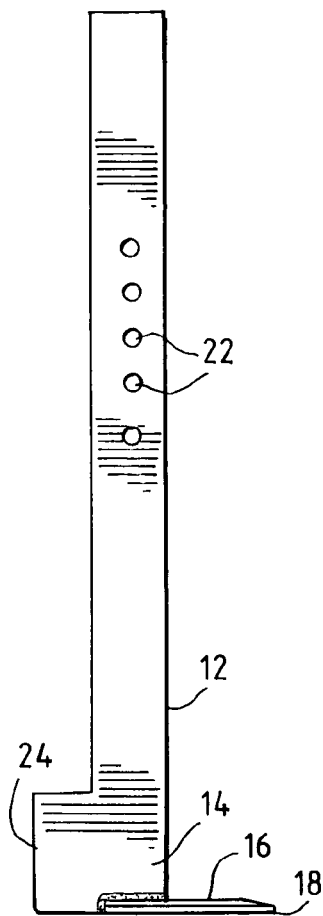
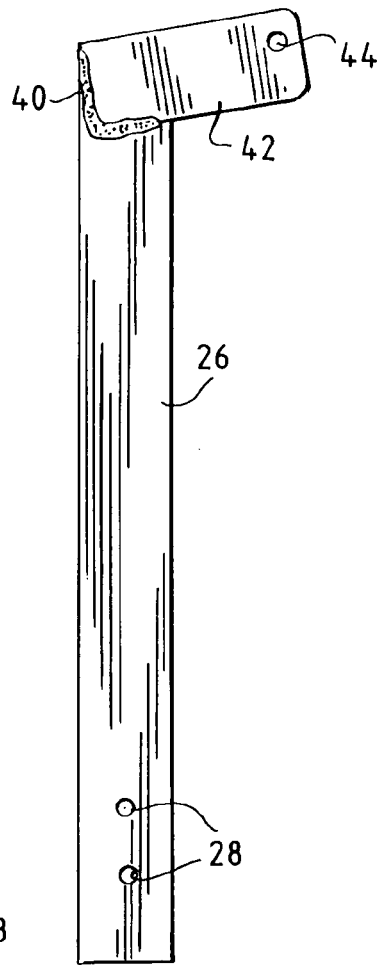
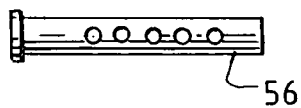
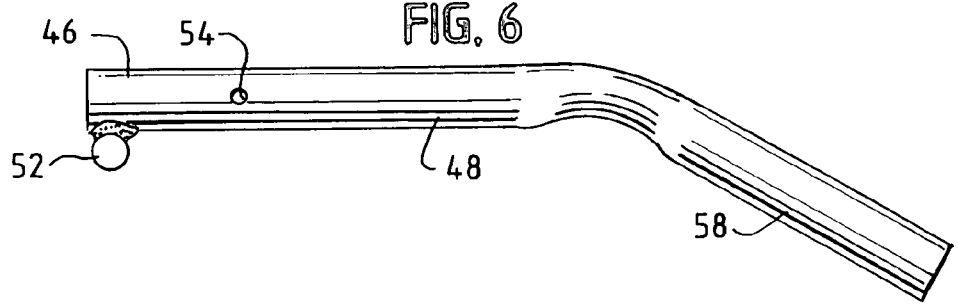
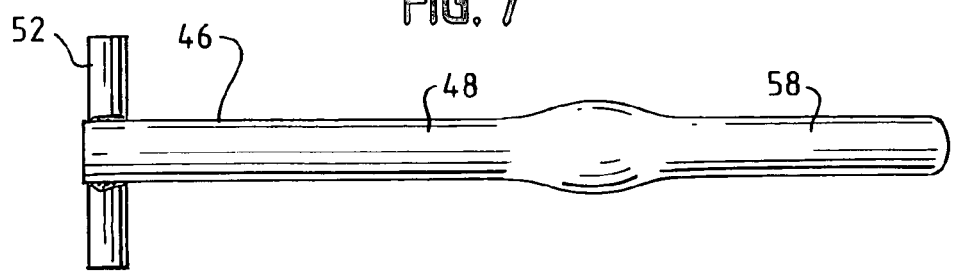

BRICK GRIPPING DEVICE

CROSS REFERENCE TO RELATED APPLICATION

This patent application claims priority from U.S. Provisional Application Ser. No. 60/540,376, filed on Jan. 30, 2004, the entire contents of which are incorporated by reference herein.

BACKGROUND OF THE INVENTION

The present invention relates generally to the handling of heavy, dense articles made from organic materials formed into discrete shapes, fired at high temperatures in kilns and more particularly to the movement of bricks from a storage area to a location for ultimate installation in a driveway, roadway, or other such earth surface to endure the wear and tear of pedestrian and vehicular traffic that moves thereacross.

The brick gripping device is operable to clasp together a series of stacked bricks into a secure assembly and thereafter maintain the assembly in a locked position as a worker carries the assembly from a storage area to a place of installation. The device includes a quick release mechanism operable to disengage the stacked bricks in any desired location at a work site.

DESCRIPTION OF THE PRIOR ART

In the past a worker employed an old, archaic method that involved bending over and lifting one or more bricks off a pallet or skid by hand and then carrying them to a job site. This course of action was tedious, inefficient and likely to result in dropping a brick or two during transit or walking from the storage area to the location of installation.

In some instances it has been possible to use a gripping device such as a mason's tongs to pick up discrete objects for movement from one place to another. This type of material carrier has proved unsatisfactory, however, because of being unable to lock a plurality of objects in a secure position during transit and keep them from falling out from the grasping portion of the tongs. Further, tongs may be used to handle clay, masonry bricks, but are not adaptable for carrying paving or concrete bricks, or the like. Mason's tongs are used to clamp bricks in a side by side horizontal position, whereas in the brick paving industry this orientation is not practicable. The present invention is designed specifically to clamp on to a stacked row of vertically positioned bricks.

Illustrative of prior art attempts to advance the state of the art is U.S. Pat. No. 5,826,927 to Long that discloses a hand held material carrier that is complicated in its structural association of parts, is therefore costly to make, does not provide for a quick release mechanism, is limited to handling masonry blocks and thus unable to carry the types of bricks used in paving applications.

SUMMARY OF THE INVENTION

Therefore, it is a primary object of the present invention to provide an improved brick gripping mechanism that includes a base member and an upper member for adjustable and reciprocal movement thereover, a crank member rotatably connected to the upper member, and a quick release mechanism for securing together the base member and the upper member in a preselected locked position and operable upon demand to disconnect immediately the locked orientation between the base member and the upper member.

It is a further object of the present invention to provide an improved brick gripping mechanism that is operable to pick up a series of vertically stacked bricks from a storage area and transport them in a secured position to a work site.

Another object of the present invention is to provide an improved brick gripping mechanism that releases quickly a plurality of vertically stacked bricks from a locked orientation therein upon delivery to a job site.

An additional object of the present invention is to provide an improved brick gripping mechanism that is operable to be positioned between a bottom brick and a top brick of a series of vertically stacked bricks, thereafter locked in position for carrying from a storage area to a job site and thereat quickly release the stacked bricks from their locked position.

BRIEF DESCRIPTION OF THE DRAWING

The foregoing and other characteristics, objects, features and advantages of the present invention will become more apparent upon consideration of the following detailed description, having reference to the accompanying figures of the drawing wherein:

FIG. 1 is a perspective view of an assembled brick gripping device wherein associated component parts are combined to comprise the elements of the present invention.

FIG. 2 is an enlarged sectional view of a quick release mechanism taken along lines 2—2 of FIG. 1 showing details of the quick release mechanism for securing together top and bottom members of the device at any preselected location so as to provide a desired unobstructed dimensional length between a portion of the top member and a base of the bottom member.

FIG. 3 is a side elevational view of a base member of the device showing a lower portion protruding therefrom tapering to an outermost pointed section at its extended end.

FIG. 4 is a side elevational view of an upper member adaptable to fit over the base member in slideable contact therewith for at times being secured thereto by a cooperative pinning mechanism arrangement.

FIG. 5 is an enlarged view of a pin adaptable to secure together an eccentric crank member to an extended portion of the upper member in rotatable contact therebetween and operable to at times hold a stack of bricks in the device for movement between a first and any other of several locations at a work site.

FIG. 6 is a side elevational view of the eccentric crank member showing at one end an integral pin extending outwardly therefrom and apertures formed therethrough sharing a common axis.

FIG. 7 is a top plan view of the eccentric crank member shown in FIG. 6 showing in detail the length of the integral pin extending outwardly from the crank member.

DESCRIPTION OF A PREFERRED EMBODIMENT

Referring now to FIGS. 1–7, there is shown in perspective an improved brick gripping device, generally indicated by reference numeral 10, including associative component members that greatly enhance productivity on a job site and limit painful and labor strain on the body of a worker. The worker or operator is able to insert the device under a full stack of bricks placed on top of each other in a vertically oriented position and, without bending over, is able to lift the entire stack of bricks at one time, limiting and possibly avoiding damage and pain to a worker's back.

Again referring to FIG. 1, the gripping device 10 comprises a vertically extending base or foot member 12, substantially square in shape, and preferably manufactured from hot rolled steel. As best seen in FIG. 3, base member 12 includes at its bottom end 14 a rectangularly shaped foot or wedge member 16 protruding outwardly from the bottom end 14 and sloping to a tapered end 18. The wedge member 16 is preferably fabricated from hot rolled heat treated steel and secured to the base member 12 as by welding or other suitable means of attachment. The wedge member 16 has extending outwardly from both sides of the base member 12, flat edge members 20,20, so as to provide stability or otherwise assist in maintaining the base member in an upright position. A plurality of apertures 22 are formed through opposite sides of the base member to form a series of aligned holes, each pair of holes having a common axis. The base member 12 also includes at its bottom back side a solid block 24 preferably made from hot rolled heat treated steel and integrally formed therewith, welded or otherwise suitably secured thereto.

As shown in FIG. 4, an upper telescopic member 26 is preferably formed from hot rolled steel, shaped substantially square and having inner width dimensions sufficient to fit over and about the outer width square dimensions of the base member 12. The upper member 26 is operable to move or slide in a telescopic manner up and down the exterior of the base member 12. A plurality of apertures 28 are formed through opposite sides of the upper member 26 to form at least two pairs of aligned holes having a common axis.

It should be noted that one pair of apertures 28 of the upper member 26 is operable to be aligned with any selected pair of apertures 22 of the base member 12 along a coincident axis so that a pin 30 (best seen in FIG. 2) may be inserted through the selected pair of base member apertures 22 and the aligned pair of upper member apertures 28 to maintain the base member 12 and upper member 26 in locked relationship therebetween.

As best shown in FIG. 2, the pin 30 includes a semicircular ring 32 secured to a first end 34 of the pin and extending substantially around, about and away from the outer sides of the upper member 26. The ring 30 includes an unsecured end having a looped opening 36 operable for easy, positioning on and quick releasing from the other or second end 38 of the pin 30. Thus, the pin 30 and ring 32 cooperate to facilitate insertion placement through the apertures and removal of the pin therefrom for locking and unlocking the base member 12 and the upper member 26 to and from each other.

The upper member 26 further includes at its top end 40 a pair of spaced apart arms 42, 42 preferably formed from hot rolled steel, both arms welded or otherwise suitably joined to the telescopic member 22 on outer side surfaces thereof, preferably at an angle of 120 degrees from a vertical centerline axis of the upper member 26. Each arm 42 has at least one hole bored therethrough so as to form a pair of apertures 44, 44 that share a common axis.

Now referring to FIGS. 6 and 7, there is shown a handle or eccentric crank member 46 preferably made from tubular hot rolled steel having a first or front end portion 48 bent, braked or otherwise suitably disposed at a preferred angle of 60 degrees with a second end 58 of the handle 46.

The handle 46 has secured at its first end 48 as by welding or other suitable attachment a solid, preferably hot rolled cylindrical member 52. As best seen in FIG. 6, at least two holes 54, 54 are bored through the hollow tube 46 so as to form at least one pair of apertures that share a common axis.

The handle 46 is operable to be secured between the arms 42, 42 in a position whereby apertures 54, 54 are aligned on a coincident axis with the apertures 44, 44 of the arms 42, 42, whereby a solid cylindrical pin 56 may be inserted therethrough to mount the handle 46 in adjustable, rotatable movement within the arms 42, 42. The pin 56 has a plurality of bores formed therethrough to receive or accommodate a cotter pin (see FIG. 1) or other suitable means to protect against inadvertent slipping of the pin 56 out of engagement with the connection between the handle 46 and arms 42, 42.

The present invention employs fundamental engineering teaching in using associated structural components to apply a pressure point between the stack of bricks and the cylindrical end of the eccentric handle effective to rotate within the angled arms of the base member by pinching down against the top brick and transmit force to the foot of the base member and thereby clamp therein a full stack of bricks.

In the operation of the present invention, a worker in using the brick gripping device would set up the unit adjacent a skid or pallet that might support a total of 64 vertical stacks of bricks. Each vertical stack or row of paver bricks would normally contain seven to ten bricks, each having a height of about two inches. The device, however, is adjustable to handle at one time between five and ten bricks secured in the device. The worker places the unit against a row of bricks and wedges the tapered front edge of the base member underneath the under side surface of the bottom brick in the row. If necessary, in order to wedge the unit completely under the row, it may require the worker to kick the block member 24 disposed at the back side of the base member 12. If additional force is necessary, a hammer or sledge may be employed to drive home the wedge under the row of bricks.

The worker then adjusts the height of the unit by removing the quick release pin to allow the upper member 26 to slide along the base member upwardly to clear the top of the row of bricks and then slide the upper member downwardly to align apertures along a common axis an thereafter replace the pin therethrough so as to maintain the base member and the upper member in a locked relationship. The worker then grasps the free end of the handle 46, lifting it upwardly so as to clamp the cylindrical member 52 onto the top most brick of the row with enough pressure to secure the row of bricks in the device.

The worker can then lift the assembly up and away from the skid or pallet and transport or carry the row of bricks to the job site.

While the present invention has been described with reference to the above preferred embodiments, it will be understood by those skilled in the art, that various changes may be made and equivalence may be substituted for elements thereof without departing from the scope of the present invention. In addition, modifications may be made to adapt a particular situation or material to the teachings of the present invention without departing from the scope of the present invention. Therefore, it is intended that the invention not be limited to departing from the scope of the present invention. Therefore, it is intended that the invention not be limited to the particular embodiments disclosed in carrying out this invention, but that the present invention includes all embodiments falling within the scope of the appended claims

I claim:

1. A gripping device for moving articles from a storage area to a work location comprising, an elongate vertical base member, a rectangularly shaped wedge member secured to a bottom end of said base member and extending forwardly therefrom, said wedge member has oppositely disposed sides extending outwardly from a bottom end of said base member and has a forwardly extending surface that slopes to a tapered end, an upper telescopic member adaptable to fit over and about said base member in slidable contact therewith, and at times secured at a predetermined location thereon, a connecting pin member that locks said base member and said telescopic member at said predetermined location, a pair of spaced apart arms secured to a top end of said telescopic member on outer side surfaces thereof, said arms forming an obtuse angle with a vertical centerline axis of said telescopic member, an elongate handle disposed and secured at a first near end between said spaced arms for rotatable movement therebetween, said handle is formed in an eccentric configuration having a front end angled from its other end, a longitudinal member affixed at an outer end of said handle for at times contacting a top one of said vertical row of articles to clamp said row of articles between said base member and said telescopic member, and a semi circular ring member having one end secured to a first end of said connecting pin member and another end having an opening for positioning on and quickly releasing from a second end of said connecting pin member so as to rapidly extract the pin member and disconnect said telescopic member from said base member, whereby said handle is operable to rotate downwardly against said top one of a said vertical row of articles disposed upon said wedge member and clamp said row of articles therebetween for transportation from one location to one or more work site locations for release thereat.

2. A gripping device for moving articles from a storage area to a work location comprising, an elongate vertical base member, a wedge member secured to a bottom end of said base member and extending forwardly therefrom, an upper telescopic member adaptable to fit over and about said base member in slideable contact therewith, and at times secured at a predetermined location thereon, a pair of spaced apart arms secured to a top end of said telescopic member on outer surfaces thereof, said arms forming an obtuse angle with a vertical centerline axis of said telescopic member, an elongate handle disposed and secured at a first near end between said spaced arms for rotatable movement therebetween, a quick release member for disconnecting said telescopic member from said base member, whereby said handle is operable to rotate downwardly against a top one of a vertical row of articles disposed upon said wedge member and clamp said row of articles therebetween for transportation from said storage area to and release at one or more chosen work site locations, said quick release member comprises, a pin member for at times securing together said base and said telescopic members, and a semi circular ring member having one end secured to a first end of said pin member and another end having an opening for positioning on and quickly releasing from a second end of said pin member so as to rapidly extract the pin member and disconnect said telescopic member from said base member.

3. A gripping device as claimed in claim 2 comprising, at least one hole formed through each of said arms to form a pair of holes aligned along a common axis, said handle having a hole formed therethrough aligned along said common axis of said pair of holes of said arms, and a cylindrical member extending through said holes of said arms and said hole of said handle for rotatable movement therebetween.

4. A gripping device as claimed in claim 2 comprising, a longitudinal member affixed at an outer end of said handle for at times contacting said top one of said vertical row of articles to clamp said row of articles between said base member and said telescopic member.

5. A gripping device as claimed in claim 2 wherein, said base member is formed in a substantially square configuration, and said telescopic member is formed in a substantially square configuration that is complemental to and fits over and about said base member for said slideable contact therewith.

6. A gripping device as claimed in claim 2 wherein, said wedge member is shaped rectangularly and has oppositely disposed sides extending outwardly from a bottom end of said base member and has a forwardly extending surface that slopes to a tapered end.

7. A gripping device as claimed in claim 2 comprising, said handle is formed in an eccentric configuration having a front end angled substantially 60 degrees from its other end.

8. A gripping device as claimed in claim 2 wherein, said arms form a preferred angle of substantially 120 degrees with said vertical centerline of said telescopic member.

9. A gripping device for moving articles from a storage area to a work location comprising, an elongate vertical base member, a wedge member secured to a bottom end of said base member and extending forwardly therefrom, an upper telescopic member adaptable to fit over and about said base member in slideable contact therewith, and at times secured at a predetermined location thereon, a pair of spaced apart arms secured to a top end of said telescopic member on outer surfaces thereof, said arms forming an obtuse angle with a vertical centerline axis of said telescopic member, an elongate handle disposed and secured at a first near end between said spaced arms for rotatable movement therebetween, and a solid block shaped member secured to a bottom back side of said base member and extending backwardly therefrom, whereby said handle is operable to rotate downwardly against a top one of a vertical row of articles disposed upon said wedge member and clamp said row of articles therebetween for transportation from said storage area to and release at one or more chosen work site locations and a worker may exert force against said block member to move said wedge member underneath a bottom one of said vertical row of articles.

10. A gripping device as claimed in claim 9 comprising, a connecting member for securing together said base member and said telescopic member at said predetermined location.

11. A gripping device for moving articles from a storage area to a work location comprising,
an elongate vertical base member,
a plurality of apertures formed through opposite sides of said base member to form a series of aligned holes, each pair of holes having a common axis,
a wedge member secured to a bottom end of said base member and extending forwardly therefrom,
an upper telescopic member adaptable to fit over and about said base member in slideable contact therewith, and at times secured at a predetermined location thereon,
a plurality of apertures formed through opposite sides of said telescopic member to form at least two pairs of aligned holes, each pair of holes having a common axis,
one pair of holes of said base member aligned with one pair of holes of said telescopic member along a common axis,
a pair of spaced apart arms secured to a top end of said telescopic member on outer surfaces thereof, said arms forming an obtuse angle with a vertical centerline axis of said telescopic member,
an elongate handle disposed and secured at a first near end between said spaced arms for rotatable movement therebetween,
a connecting member disposed within said one pair of holes of said base member and said one pair of holes of said telescopic member for securing said base member and said telescopic member at said predetermined location,
said connecting member including a pin member extending through said holes of said base member and said holes of said telescopic member, and
a ring member having one end secured to a first end of said pin member and another end having a looped opening for positioning on and quickly releasing from a second end of said pin member,
whereby said handle is operable to rotate downwardly against a top one of a vertical row of articles disposed upon said wedge member and clamp said row of articles therebetween for transportation from said storage area to and release at one or more chosen work site locations and said pin member may be quickly removed from said holes of said base and telescopic members for rapid disconnect therefrom.

12. A gripping device for moving articles from a storage area to a work location comprising,
an elongate vertical base member,
a wedge member secured to a bottom end of said base member and extending forwardly therefrom,
an upper telescopic member adaptable to fit over and about said base member in slideable contact therewith, and at times secured at a predetermined location thereon,
a pair of spaced apart arms secured to a top end of said telescopic member on outer surfaces thereof, said arms forming an obtuse angle with a vertical centerline axis of said telescopic member,
an elongate handle disposed and secured at a first near end between said spaced arms for rotatable movement therebetween,
a connecting member that locks said base member and said telescopic member at said predetermined location,
said connecting member including a pin member extending through apertures of said base member and apertures of said telescopic member aligned along a common axis, and
a ring member having one end secured to a first end of said pin member and another end having a looped opening for positioning on and quickly releasing from a second end of said pin member,
whereby said handle is operable to rotate downwardly against a top one of a vertical row of articles disposed upon said wedge member and clamp said row of articles therebetween for transportation from said storage area to and release at one or more chosen work site locations and said pin member is quickly removed from said apertures of said base and said telescopic members for rapid unlocking therefrom.

13. A gripping device as claimed in claim 12 wherein said ring member is semi circular in configuration.

14. A gripping device as claimed in claim 12 wherein said base member, said telescopic member, said wedge member, said arms, and said handle are fabricated from hot rolled steel.

* * * * *